3,131,115
FLAME RETARDANT POLYESTER RESINOUS COMPOSITION CONTAINING HALOGEN AND PHOSPHORUS
Paul Robitschek, Wilson, and Claude Thomas Bean, Niagara Falls, N.Y., assignors to Hooker Chemical Corporation, Niagara Falls, N.Y., a corporation of New York
No Drawing. Original application Jan. 24, 1957, Ser. No. 635,949, now Patent No. 2,931,746, dated Apr. 5, 1960. Divided and this application Sept. 21, 1959, Ser. No. 458
14 Claims. (Cl. 161—191)

This invention relates to new resinous compositions, comprising a polymerizable mixture of an unsaturated polyester (also referred to in the art as an unsaturated alkyd, or, unsaturated linear polyester resins) and an unsaturated cross-linking agent, said mixture including a chemically combined component which imparts flame retardance to the polymerized mixture which is a chemical reaction adduct of a hexahalocyclopentadiene with an unsaturated polycarboxylic acid or acid anhydride or acid halide or an unsaturated polyhydric alcohol or esters thereof, and said mixture also including a phosphorus containing compound which compound is reactive in the esterification reaction so that the phosphorus becomes chemically combined in the polyester. This invention also relates to the polymerized, flame retardant compositions in their finally reacted form, that is, as resinous, insoluble, infusible compositions, in which phosphorus is chemically combined prior to the cross-linking reaction either in the unsaturated polyester or in the unsaturated cross-linking agent.

This is a division of the parent application Serial No. 635,949, filed January 24, 1957, now Patent No. 2,931,746.

This application is a continuation-in-part of our copending application Serial Number 308,921, filed September 10, 1952, now United States Patent 2,779,701, and more particularly relates to halogen containing polyesters of the type described therein, also containing combined phosphorus in the finally reacted resinous composition, wherein the phosphorus is derived either from the polyester portion of the resin or the cross-linker portion of the resin or both.

The production of infusible, insoluble polyester resins which are flame retardant and have high resistance to heat is of considerable commercial importance. For instance, castings, moldings, foamed articles or laminated structures bonded by polyester type resins are, for many uses, required, or at least desired, to be resistant to fire and are also required to endure heat without deterioration. A typical illustration of an application having such a requirement is found in castings for live electrical contacts, which must not be ignited by sparks nor deteriorated by heat generated therein. Structural members, pipes, wall coverings, panels, ash trays, etc., are further illustrations where flame retardance is desirable.

Heretofore certain chemical adducts have been disclosed as being useful in the preparation of polyester resins. For example, it is known that the maleic acid-cyclopentadiene Diels-Alder adduct resulting from the diene synthesis and its reaction products with alpha, beta-unsaturated dicarboxylic acids or anhydrides and glycols form resinous compositions which may be made insoluble and infusible by further reaction with copolymerizable olefins to form a cross-linked polymer. Such compositions are chemically different from the products of this invention because the double bond remaining in the linear unsaturated polyester so produced is highly reactive and can enter directly into the cross-linking reaction, whereas, the corresponding linkage in the halogen-containing derivatives employed in making the compositions of this invention is non-reactive in said copolymerization reaction. Moreover, they do not possess flame retardance. Attempts have been made to impart flame retardance to such hydrocarbon type resinous polyester compositions by incorporating therein inert fireproofing agents, such as antimony oxide or chlorinated paraffin wax, as fillers which do not enter into chemical reaction with the components of the resin; however, this results in a loss in the desirable properties, particularly with respect to heat resistance, which are usually associated with polyester resins; likewise the property of being able to produce satisfactory articles of commerce may be seriously impaired. Furthermore, the mere addition of phosphorus compounds such as triphenyl phosphate, tricresyl phosphate, triethyl phosphate, trixylyl phosphate etc. as additives in physical combination are equally unsatisfactory. Other attempts to impart flame retardance are also known which involve chemically combining tetrachlorophthalic acid or anhydride in the polyester resin. Compositions so produced are chemically unrelated to the products of this invention; they have only poor flame retardant properties and they usually possess low stability and low strength at elevated temperatures; therefore, they are not entirely satisfactory for many applications. Still other attempts involving the use of certain unsaturated organic phosphorous compounds as cross-linking agents which impart flame retardance to the final polyester resin have likewise been found unsatisfactory.

It is an object of this invention to provide resinous compositions which are highly resistant to burning and yet possess many of the desirable characteristics usually associated with polyester resins. A further object is to provide resinous compositions which are highly resistant to exposure at elevated temperatures. A still further object is to prepare resinous compositions which are suitable for casting, molding, foaming or laminating and which are characterized by possessing the desirable properties usually required in resins in the preparation of castings, moldings, foamed articles and laminates, and which are also characterized by being capable of forming articles of commerce which have a pleasing appearance and wide utility. A particular object of this invention is to make available in commerce compositions comprising a mixture of an unsaturated polyester and an olefinic cross-linking agent, with or without the presence of catalysts and/or inhibitors and/or promoters or accelerators, which are capable of polymerization to an insoluble, infusible, fire resistant polyester resin. A further objective is to provide methods for chemically combining hexahalocyclopentadienes in the form of an adduct into the polyester. A still further objective is to provide methods for the preparation of these unsaturated polyesters and their combination with olefinic cross-linking agents.

The principal objective of this invention is to incorporate phosphorus chemically into a component of the polymerizable mixture of the aforementioned unsaturated polyesters, or by means of the olefinic cross-linking agent so that the final copolymer contains phosphorus in chemical combination, thereby obtaining a final copolymer which possesses greatly improved resistance to fire over such resins without phosphorous, improved resistance to weathering over such non-containing phosphorus resins, and also possessing good color characteristics among other advantages.

These objects, and still others which will become apparent to those skilled in the art on consideration of our specification and claims, are accomplished by the present invention.

In accordance with this invention the unsaturated polyester may contain the component which imparts flame retardance in either the polycarboxylic acid or anhydride unit and/or in the polyhydric alcohol unit of the polyester. The unsaturated polyester must contain unsaturation which is capable of copolymerization with the unsaturation in the cross-linking agent. Such copolymerizable unsaturation is an essential characteristic of the unsaturated polyester portion of the mixture of this invention. We have found that the double bond, remaining in a polyester chain, which is derived from the reaction adducts of hexahalocyclopentadienes with mono-olefinic polycarboxylic acids or anhydrides, or mono-olefinic polyhydric alcohols or, esters thereof including acid chlorides is not sufficiently reactive to enter into the cross-linking reaction. We render such polyesters copolymerizable in the cross-linking reaction by incorporating in the esterification product a reactive and unsaturated chemical ingredient which retains its active unsaturation after being chemically combined in the polyester chain. Alternatively, or in addition to including flame retardant components in the unsaturated polyester, as just described, and in accordance with this invention, the cross-linking agent may contain the component which imparts flame retardance to the polyester resins of this invention.

The reactant components which impart flame retardance to the final polymerized resinous compositions included in this invention, i.e., the polyester resins, may best be prepared by effecting the chemical addition of a hexahalocyclopentadiene with an unsaturated polycarboxylic acid or acid anhydride or acid halide, or an unsaturated polyhydric alcohol, or esters thereof, presumably in accordance with the following equations, respectively, in which the specific reactants are given for purposes of illustration only:

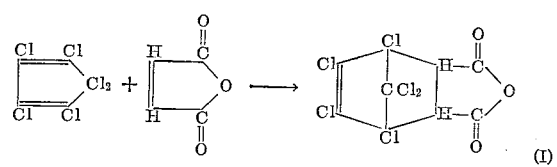

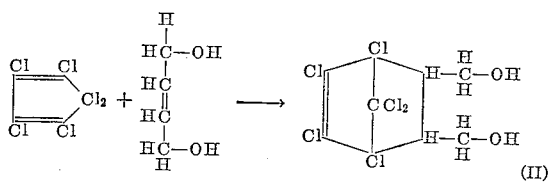

These, and similar Diels-Alder type reaction adducts of hexahalocyclopentadienes which are more fully disclosed hereinafter, can be esterified with a polyhydric alcohol or a polycarboxylic acid, to produce a soluble polyester chain containing the olefinic linkage originally present in the Diels-Alder adduct, as exemplified by the following product formed by esterification of the product of reaction (I) with ethylene glycol:

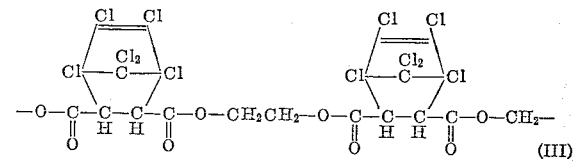

The olefinic linkage contained in such chlorine containing polyester chains (III), has been found by us to be unreactive in the copolymerization reaction with olefinic cross-linking agents, such as styrene, divinyl compounds, diallyl compounds, etc., even in the presence of the most active catalysts for such reactions. However to render polyesters containing the Diels-Alder adducts of hexahalocyclopentadienes copolymerizable with olefinic cross-linking agents whereby infusible, insoluble and flame retardant compositions may be produced, we introduce copolymerizable unsaturation into the polyester chain by esterifying the foregoing components in the presence of a reactive unsaturated chemical ingredient which is capable of rendering the polyester copolymerizable even after it is in chemical combination in the polyester molecule. A particularly suitable material for this use is maleic anhydride; however any unsaturated polycarboxylic acid or anhydride, or, polyhydric alcohol, or, esters thereof, including the acid chlorides, capable of esterification without losing its ability to copolymerize with olefinic cross-linking agents may be employed. Alternatively, or in addition to providing unsaturation in this manner, we may also provide for it by employing a Diels-Alder reactant with hexahalocyclopentadiene which has more than mono-olefinic unsaturation, for example a di-olefin or an acetylenic compound, and which retains, after being esterified in the polyester chain, an unsaturated linkage reactive in the cross-linking reaction.

While so esterifying the foregoing material of the nature of Formula III with a material capable of rendering it copolymerizable, we may introduce a phosphorus containing material into the esterification medium so as to chemically incorporate phosphorus into the polymerizable mixture. However, if desired, the phosphorus can be introduced later by means of the cross-linking agent when copolymerizing. In either case we have found that even though the aforedescribed copolymerized resinous materials have excellent flame resistance without any chemically combined phosphorus contained therein, yet even greater fire resistance can be achieved when phosphorus is incorporated in accordance with this invention.

In addition we have found that compositions of this invention which have only moderate flame resistance, because of a lowered halogen content, have excellent flame resistance when chemically combined phosphorus is included in the composition. Although the halogen content of the final copolymerized resins in the examples following is shown to be approximately between 21 and 29 percent, halogen percentages as low as 7 percent may be used by taking advantage of the fire resistant properties lent to the composition by the chemically combined phosphorus while still maintaining the good flame resistance of these resins. The upper limit of halogen content is dictated by the molar limit of halogenated intermediate that can be used in the polyester while still maintaining copolymerizable unsaturation in the polyester chain. This upper limit is in the neighborhood of 57 percent if the cross-linking agent is of the unhalogenated type and 59 percent when both the polyester and cross-linking agent are halogenated.

If the halogen content of the polyesters is lowered, increasing amounts of phosphorus are added in order to maintain good flame-resistance characteristics of the final polymerized resin. Relatively small percentages of phosphorus, based on the final copolymerized resin, are all that are required in order to preserve good flame resistance. These percentages normally will vary between approximately 0.1 percent and 2.5 percent although compositions employing as low as 0.05 percent are sufficient to show some improved flame resistance and quantities of phosphorus as high as approximately 10 percent may sometimes be fully chemically incorporated depending upon the types of polyester, cross-linking agent and phosphorus introducing chemical employed.

Among the phosphorus containing materials which may be used in order to chemically combine the phosphorus in the copolymerized resin by introducing the phosphorus as a part of the polyester portion of the resins of this invention are: phosphorus oxychloride, phosphorus pentachloride, hydroxymethyl phosphonic acid, phosphorous acid, phosphorus trichloride, phosphoric acid, benzene phosphonic acid, tris methylol phosphine oxide, bis-hydroxymethyl phosphinic acid and the like. Certain of these phosphorus containing materials become incorporated in the acid portion of the polyester while others become incorporated in the alcohol portion of the polyester while hydroxymethyl phosphonic acid links up with both portions of the polyesters.

Among the phosphorus containing materials which may be used in order to chemically combine the phosphorus in the copolymerized resin by introducing it as a part of the monomeric cross-linker are diallyl benzene phosphonate, bis (betachloroethyl) vinyl phosphonate, di-(chloropropyl) propenyl phosphonate, tri-allyl phosphate, di-allyl ethyl phosphate, allyl diethyl phosphate, allyl propyl phosphate, allyl dipropyl phosphate and the like.

The resinous compositions of this invention can be prepared by first effecting the esterification of the selected polycarboxylic acids with the desired polyhydric alcohols in the presence of one of the phosphorus containing materials listed in the next preceding paragraph and in the presence of the reactive unsaturated chemical ingredient, whereby an unsaturated polyester is formed; then mixing the resulting composition with the chosen copolymerizable olefinic cross-linking agent; and, thereafter copolymerizing the mixture to form an insoluble, infusible polyester resin. Another method which may be employed for producing resinous compositions of this invention, which is in accordance with our findings, comprises effecting the chemical addition of hexahalocyclopentadiene to less than the total theoretical number of olefinic linkages contained in an unsaturated polyester molecule in the presence of one of such phosphorus containing materials listed above. For example, by effecting the Diels-Alder reaction of one molecule of hexahalocyclopentadiene with one molecule of polyethylene glycol maleate, a product is produced which contains the hexahalocyclopentadiene in chemical combination in the polyester chain and which also contains active unsaturation which is copolymerizable in the cross-linking reaction; the product so produced is then combined with the chosen olefinic cross-linking agent and thereafter copolymerized. Esterification of the desired ingredients may be effected in the presence of esterification catalysts and/or chain terminating agents, etc. A preferred procedure involves introducing the selected ingredients to be esterified, and the phosphorus containing material in prodetermined proportions, into a suitable esterification vessel provided with heating and/or cooling means, an agitator, means for passing an inert gas such as nitrogen or carbon dioxide through the reaction mixture, means for removing water of esterification, an inlet, an outlet, and any other accessories necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product, if solid, and if prepared in accordance with the first procedure described, is broken up and then mixed with the olefinic cross-linking agent at room temperature, preferably in the presence of a polymerization inhibitor. If prepared in accordance with the second method, a hexahalocyclopentadiene is chemically added to a soluble unsaturated polyester molecule in an amount insufficient to react out all the double bonds in the polyester and the material resulting by this treatment is then compounded with the olefinic cross-linking agent.

We have found that the cross-linking agent may be advantageously combined with unsaturated polyesters prepared in accordance with these methods while the unsaturated polyester is at an elevated temperature and that the olefinic cross-linking agent may also be at an elevated temperature thereby facilitating solution and mixing. To prevent premature polymerization at this stage, a polymerization inhibitor is advantageously added to the mixture, or, preferably to one of its components prior to mixing, especially if the mixture is to be stored or shipped in commerce prior to curing or effecting the copolymerization reaction into the insoluble, infusible, polyester resin. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

In order that this invention may be more readily understood and to further illustrate the details thereof, the following examples are given which show preferred compositions of this invention and methods for their preparation. Certain of the Diels-Alder adducts of hexahalocyclopentadiene disclosed herein are new compositions of matter which are more fully described, including methods for their preparation, and claimed in the copending applications hereinafter identified.

In the following examples, in which parts are given by weight unless otherwise stated, flame retardance is reported as burning rate in inches per minute determined by ASTM D757–49, the specifications for this test being: A glow bar is heated to 950 degrees centigrade by alternating or direct current, the electrical input of which is adjusted to 350±20 watts. A test specimen 5 x ½ x ⅛ inches is clamped in a holder with its length horizontal and at right angles to the axis of the igniting bar and its width in a vertical plane. The length of the specimen free to burn is four inches. The front end of the specimen is brought into contact with the igniting bar and allowed to remain in this position for three minutes. After three minutes any flaming shall be extinguished, the specimen removed, and the length burned measured. The length burned divided by three then gave the burning rate in inches per minute.

Heat distortion temperature, defined as that temperature in degrees centigrade a plastic specimen, ⅛ to ½ inches by ½ inch by five inches and supported on its narrowest side by metal supports four inches apart and immersed in a suitable liquid heat transfer medium, which is raised in temperature at a rate of 2 degrees per minute, and under a fiber stress load of 264 pounds per square inch at the center, deflects at the center a distance of 10 mils or 0.01 inch. This test is carried out according to ASTM specification D–648–45T titled "Heat Distortion Temperature of Plastics."

Color Hazen determined on the liquid polyester resin compound prior to being copolymerized, is reported as units of color produced by platinum, in the form of the chloro-platinate ion per liter of water. Each unit of color is that produced by one milligram of platinum, in the form of the chloro-platinate ion, per liter. A color Hazen of 200 would therefore be equivalent to that produced by 200 milligrams of platinum per liter. This method of preparing color is taken from paragraph 3.2, page 88 of "Standard Methods for the Examination of Water, Sewage and Industrial Wastes," Tenth Edition, 1955, prepared and published by the American Health Association, Inc.

EXAMPLE 1

Fifty-two and eight-tenths parts of ethylene glycol and 90 parts of diethylene glycol were charged into an esterification or resin vessel provided with heating and/or cooling means, an agitator, means for maintaining an atmosphere of an inert gas over the reaction mixture, means for removing water of esterification, temperature recording means, charging inlets and outlets, etc. The charge was blanketed with an inert atmosphere of nitrogen, agitated, heated to a temperature between about 80 to 100 degrees centigrade, then 394.7 parts of 1,4,5,6,7,7-hexachlorobicyclo-(2.2.1)-5-heptene-2,3-dicarboxylic anhydride (hereinafter referred to as HET), prepared by the method which involves the Diels-Alder reaction of hexachlorocyclopentadiene with maleic anhydride, was blended into the agitated glycols. Seventy and eight-tenths parts of maleic anhydride was then blended into the charged reactants while the reaction mixture was being raised to a temperature of about 160 to 170 degrees centigrade by application of external heat. The water of esterification liberated during the reaction was separated and periodically measured and the acid number of the reaction mixture was also periodically measured to determine the progress of the reaction. When an acid number of approximately 55 was approached, 3.6 parts of tetrahydrofurfuryl alcohol was added to the reaction mixture. Upon reaching an acid number of about 45 the entire contents of the reaction vessel was cooled, then cast into pans under an inert atmosphere. A transparent, faintly colored, hard, brittle, soluble material, having 38.4 percent by weight chlorine content, melting in a temperature range above room temperature and below 100 degrees centigrade, and having a specific gravity at room temperature of about 1.45 was obtained.

EXAMPLE 2

One hundred grams of the cast product recovered in Example 1 was broken into small lumps, then added in small portions, with agitation, to 30 grams of styrene maintained under an inert atmosphere, containing 0.03 gram of hydroquinone, until completely dissolved. Complete solution consumed a period of more than 24 hours even with continued vigorous agitation. The resulting mixture was a clear, substantially colorless solution having a viscosity of about 30 poises at 25 degrees centigrade on a Gardner bubble viscometer.

EXAMPLE 3

Fifty parts of the mixture prepared in Example 2 were agitated with 0.5 part of a catalyst mixture comprising 50 parts of benzoyl peroxide and 50 parts of tricresyl phosphate. The resulting mixture was cast in a glass tube 16 inches long and having an inside diameter of 1 3/16 inches and set by heating at a temperature of about 80 degrees centigrade for a period of about one-half hour. A hard, tough, clear, insoluble, infusible substantially colorless polyester resin was obtained which has a 30 percent chlorine content by weight and which was immediately self-extinguishing on removal from an oxidizing flame, giving a result of 0.18 inch per minute by the ASTM D757–49 test, a color Hazen of 120, and a heat distortion temperature of 82 degrees centigrade.

The data for making the polyester and cross-linked resin of Examples 1, 2, 3, are reproduced from our parent and copending application, Serial No. 308,921, filed September 10, 1952, of which this application is a continuation-in-part. Examples 4 and 5 following are based on Example 22 of said copending application.

EXAMPLE 4

One hundred grams of the cast product recovered in Example 1 were broken into small lumps, then added in small portions, with agitation, to 30 grams of diallyl benzene phosphonate, until completely dissolved. The resulting mixture was very viscous.

EXAMPLE 5

Fifty parts of the mixture prepared in Example 4 were agitated with 0.5 part of a catalyst mixture comprising 50 parts of benzoyl peroxide and 50 parts of tricresyl phosphate. The resulting mixture was cast in a 16 inch by 1 3/16 inch inside diameter glass tube and set by heating at a temperature of about 80 degrees centigrade for a period of about one-half hour. A hard, clear, insoluble, infusible, substantially colorless polyester resin was obtained which had a 30 percent chlorine content by weight and which was immediately self-extinguishing on removal from an oxidizing flame, and gave an ASTM D757–49 result of 0.12 inch per minute, a color Hazen of 150 and a heat distortion temperature of 82 degrees centigrade.

The following example illustrates the employment of 1,4,5,6,7,7 - hexachlorobicyclo - (2.2.1)-5-heptene-2,3-dicarboxylic acid (hereinafter referred to as HET acid) in place of the anhydride as given in Example 1 and is repeated from Example 31 of said copending application.

EXAMPLE 6

In a manner after Example 1, the following ingredients were reacted in a resin vessel in the proportions indicated: HET acid—560 parts; maleic anhydride—95.6 parts; ethylene glycol—71.3 parts; diethylene glycol—121.5 parts and tetrahydrofurfuryl alcohol—4.6 parts.

The foregoing ingredients were reacted until an acid number of 43.5 was attained, whereupon the contents of the reaction vessel was cooled and then cast under an inert atmosphere. The casting was a transparent, substantially colorless, hard, brittle unsaturated polyester, which when dissolved in 30 percent by weight of styrene and co-polymerized, employing the benzoyl peroxide catalyst, gave a polyester resin having a chlorine content of 30 percent, a result of 0.18 inch per minute to the ASTM D–757–49 test, a color Hazen of 165, and a heat distortion temperature of 82 degrees centigrade.

The following example illustrates the use of a chemical adduct of hexachlorocyclopentadiene and fumaric acid in preparing compositions and copolymers of this invention.

EXAMPLE 7

Six and two-tenths parts of ethylene glycol and 10.6 parts of diethylene glycol were charged in a resin vessel similar to that described in Example 1 then blanketed with an inert atmosphere, agitated and heated to a temperature of about 100 degrees centigrade, whereupon 38.9 parts of an adduct formed from fumaric acid and hexachlorocyclopentadiene, and 9.8 parts of maleic anhydride were added. The reaction temperature was 155 degrees centigrade, rising to 185 degrees centigrade during the course of 20 hours. At the end of this period a light colored, clear, hard, brittle resin was obtained. On compounding 100 parts of this resin with 30 parts of styrene and 0.03 part of hydroquinone, a viscous solution was obtained which was catalyzed with 1 percent of its weight of benzoyl peroxide, and cast. A hard, tough resin was obtained, having a chlorine content of 26 percent by weight giving a result of .22 inch per minute to the ASTM D–757–49 test, a color Hazen of 150, and a heat distortion temperature of 82 degrees centigrade.

The following Example 8 is similar to foregoing Examples 6 and 7 and represents a typical formulation of the polyester resins of this invention without any phosphorous containing compound present and is set forth to indicate a typical fire resistance result obtained from the foregoing described test ASTM D-757-49 in order to contrast this result with those obtained from testing compositions of Examples 9, 10, and 11, which have the same composition as that of Example 8 except that phosphorus has been chemically combined in the polymerized resin by means of a cross-linking agent.

EXAMPLE 8

Into a suitable reaction vessel are charged 152 parts of ethylene glycol 11.6 parts of diethylene glycol, 388.8 parts of HET acid, 152 parts of adipic acid and 59.2 parts of fumaric acid. The esterification was carried out at 160 degrees centigrade under an inert atmosphere of carbon dioxide until an acid number of 17.5 was reached. To 1000 parts of the unsaturated polymerizable resin was added 400 parts of styrene containing 0.14 part of hydroquinone inhibitor. Polymerization was carried out in a manner after Example 3. There was obtained a clear, hard, resinous material having a 22.5 percent chlorine content by weight, a burning rate as set forth by the specifications of ASTM D–757–49 of 0.52 inch per minute.

EXAMPLES 9, 10, AND 11

Examples 9, 10 and 11 are similar to Example 5 in that phosphorus is introduced chemically into the co-polymerized resin by means of a cross-linking agent. Table 1 following the examples shows the effect on the burning rate of the materials of these examples as varying amounts of phosphorus are added and also shows that the burning rate may be substantially improved by employing increasing amounts of phosphorus even though the chlorine content of the resin at the same time is decreased. The compositions of Examples 9, 10, and 11 were made by adding bis (betachloroethyl) vinyl phosphonate in the varying amounts shown in Table I to portions of the styrenated resin of Example 8 but prior to its polymerization. To the clear resinous compositions obtained in each case was added 1 percent by weight of a 50-50 mixture of benzoyl peroxide and tricresyl phosphate. Polymerization was carried out in a manner after Example 3 resulting in each case in clear, hard, resinous materials. Example 8 is repeated in the table as a control.

*Table I*

PHOSPHORUS DERIVED FROM CROSS-LINKING AGENT

| Example No. | Polyester resinous composition and styrene, parts | Bis (beta-chloroethyl) vinyl phosphonate parts | Chlorine content of final polymerized resin, percent | Burning rate, in./min. as per ASTM D-757-49 |
| --- | --- | --- | --- | --- |
| 8 | 100 | | 22.5 | 0.52 |
| 9 | 100 | 3.85 | 22.1 | 0.30 |
| 10 | 100 | 7.7 | 21.8 | 0.23 |
| 11 | 100 | 15 | 21.3 | 0.10 |

A study of Table I reveals that by adding 15 parts of bis (betachloroethyl) vinyl phosphonate to 100 parts of the polymerizable compositions of this invention and more particularly of Example 8, the flame resistance was improved more than five fold, i.e., the burning rate became less than one-fifth the rate of the control material. Also the improvement in flame resistance was fairly proportional to the amount of the phosphorus containing material added, viz., the more of such material added, the greater the improvement in fire resistance.

EXAMPLE 12

Into a suitable reaction vessel were charged 91 parts of ethylene glycol, 22.2 parts of diethylene glycol, 388.87 parts of HET acid, and 78.8 parts of fumaric acid. The esterification was carried out at 160 degrees centigrade under an inert atmosphere of carbon dioxide until an acid number of 35 was reached. To 500 parts of the unsaturated polymerizable resin were added 200 parts of styrene containing 0.07 part of hydroquinone inhibitor. Polymerization was carried out in a manner after Example 3. There was obtained a clear, hard, resinous material having a standard burning rate as set forth by the specification of ASTM D–757–49 of 0.19 inch per minute, a chlorine content of 28.9 percent by weight, a color Hazen of 120, and a heat distortion temperature of 92 degrees centigrade.

EXAMPLES 13, 14, 15, AND 16

To portions of the styrenated resin of Example 12 but prior to its polymerization, was added di (chloropropyl) propenyl phosphonate in the varying amounts shown in Table II following these examples. To the clear, resinous compositions obtained in each case was added 1 percent by weight of a 50-50 mixture of benzoyl peroxide and tricresyl phosphate. Polymerization was carried out in a manner after Example 3 resulting in each case in a clear, hard, resinous material.

*Table II*

PHOSPHORUS DRIVED FROM CROSS-LINKING AGENT

| Example No. | Polyester resinous composition and styrine, parts | Di (chloropropyl) propenyl phosphonate, parts | Chlorine content of final polymerized resin, percent | Heat distortion temperature in degrees cent. |
| --- | --- | --- | --- | --- |
| 12 | 100 | | 28.9 | 92 |
| 13 | 100 | 1.0 | 28.9 | 92 |
| 14 | 100 | 3.0 | 28.3 | 92 |
| 15 | 100 | 5.0 | 28.0 | 90 |
| 16 | 100 | 10.0 | 27.1 | 71 |

Table II shows the effect on the heat distortion temperature of the final copolymerized resins formed as the maximum amount of di (chloropropyl) propenyl phosphonate which can be chemically reacted with the polyester portion of the resin is approached and then exceeded. Further discussion of the importance of this data is had in a later portion of this application.

The following Examples 17 through 25 typify formulations in wihch phosphorus is introduced into the final copolymerized resin composition or into the unpolymerized polyester resinous compositions by means of introducing a particular phosphorus containing compound into the esterification reaction vessel with the materials to be esterified. In Examples 17 and 18 the phosphorus is derived from a material which reacts with the acid portion of the polyester. In Example 19 the phosphorus is derived from a material which reacts with both the acid and the alcohol portions of the polyester while in Examples 20 through 25, the phosphorus is derived from a material which reacts with the alcohol portion of the polyester. The phosphorus compounds listed in these examples are typical of those which may be used in practicing our invention but are not to be interpreted as being the only ones which can be used. Typical results obtained when testing representative materials of Examples 17 through 25 are set forth in Table III. This table also repeats as a control the results obtained when testing the material of Example 12, the formulation of which is very similar to those of Examples 17 to 25, except that it contains no phosphorus therein.

EXAMPLE 17

Into a suitable reaction vessel were charged 116.7 grams of HET acid, 18.8 grams of fumaric acid, 24.3 grams of propylene glycol and 15.0 grams of tris-methylol phosphine oxide. Esterification was carried out at an elevated temperature of 160 degrees centigrade under an inert atmosphere of nitrogen until an acid number of 15.2 was reached. To 100 parts of the unsaturated polymerizable resin obtained were added 40 parts of styrene containing .014 part of a hydroquinone inhibitor. Polymerization was carried out in a manner after Example 3 and a hard, clear, resinous material having the properties set forth in Table III was obtained.

EXAMPLE 18

Into a suitable reaction vessel were charged 427 parts of ethylene glycol, 112 parts of diethylene glycol, 111 parts of bis (hydroxymethane) phosphinic acid, 1955 parts of HET acid and 396 parts of fumaric acid. The esterification was carried out at 160 degrees centigrade under an inert atmosphere of nitrogen until an acid number of 38 was reached. To 1000 parts of the unsaturated polymerizable resin obtained were added 400 parts of styrene containing 0.14 part of hydroquinone inhibitor. Polymerization was carried out in a manner after Example 3 and a clear, hard, resinous material having the properties set forth in Table III was obtained.

EXAMPLE 19

Three hundred and sixty-four parts of ethylene glycol, 89 parts of diethylene glycol, 41.5 parts of hydroxymethyl phosphonic acid, 314 parts of fumaric acid, and 1550 parts of HET acid were charged into a suitable reaction vessel. The reactants were esterified under an inert atmosphere of nitrogen and at an elevated temperature of 160 degrees centrigrade until an acid number of 33.4 was reached. To 1000 parts of the polymerizable unsaturated polyester obtained were added 400 parts of styrene containing 0.14 part of hydroquinone inhibitor. Polymerization was carried out in a manner after Example 3 and a clear, hard, resinous material having the properties set forth in Table III was obtained.

EXAMPLE 20

Nine hundred forty-three and three-tenths parts of ethylene glycol, 230.8 parts of diethylene glycol, 34 parts of phosphorous acid, 766.6 parts of fumaric acid and 4025.6 parts of HET acid were charged into a suitable reaction vessel. The reactants were esterified under an inert atmosphere of nitrogen and at an elevated temperature of 160 degrees centigrade until an acid number of 33.5 was obtained. To 5000 parts of the polymerizable unsaturated polyester obtained were added 2000 parts of styrene containing 0.70 part of hydroquinone inhibitor. Polymerization was carried out in a manner after Example 3 and a clear, hard, resinous material having the properties set forth in Table III was obtained.

EXAMPLE 21

Nine hundred forty-three and twenty-seven one-hundredths parts of ethylene glycol, 230.75 parts of diethylene glycol, 56.87 parts of phosphorus trichloride, 766.57 parts fumaric acid and 4025.58 parts of HET acid were charged into a suitable reaction vessel. The reactants were esterified under an inert atmosphere of nitrogen and at an elevated temperature of 160 degrees centigrade until an acid number of 32.3 was obtained. To 5000 parts of the polymerizable unsaturated polyester obtained were added 2000 parts of styrene containing 0.70 gram of a hydroquinone inhibitor. Polymerization was carried out in a manner after Example 3 and a clear, hard, resinous material having the properties set forth in Table III was obtained.

EXAMPLE 22

Into a suitable reaction vessel were charged 236 parts of ethylene glycol, 58 parts of diethylene glycol, 11.2 parts of phosphoric acid (85%), 1006 parts of HET acid and 192 parts of fumaric acid. The esterification was carried out at an elevated temperature of 160 degrees centigrade under an inert atmosphere of nitrogen until an acid number of 34 was reached. To 1000 parts of the unsaturated polymerizable resin were added 400 parts of styrene containing 0.14 part of hydroquinone inhibitor. Polymerization was carried out in a manner after Example 3 and a clear, hard, resinous material having the properties set forth in Table III was obtained.

EXAMPLE 23

Nine hundred fifty-nine and four-tenths of ethylene glycol, 234.5 parts of diethylene glycol, 756 parts of fumaric acid, 198.3 parts of benzenephosphonic acid and 3851.8 parts of HET acid were charged into a suitable reaction vessel. The reactants were esterified under an inert atmosphere of nitrogen and at an elevated temperature of 160 degrees centigrade until an acid number of 28.2 was obtained. To 3000 parts of the polymerizable unsaturated polyester obtained were added 1200 parts of styrene containing 0.42 part of a hydroquinone inhibitor. Polymerization was carried out in a manner after Example 3 and a clear, hard, resinous material having the properties set forth in Table III was obtained.

EXAMPLE 24

Ninety-one parts of ethylene glycol, 23 parts of diethylene glycol, 74 parts of fumaric acid, 47 parts of phosphorus oxychloride and 389 parts of HET acid were charged into a suitable reaction vessel. The reactants were esterified under an inert atmosphere of nitrogen and at an elevated temperature of 160 degrees centigrade until an acid number of 36.1 was obtained. To 100 parts of the polymerizable unsaturated polyester were added 40 parts of styrene containing 0.014 part of hydroquinone inhibitor. Polymerization was carried out in a manner after Example 3 and a clear, hard, resinous material having the properties set forth in Table III was obtained.

EXAMPLE 25

Ninety one parts of ethylene glycol, 23 part of diethylene glycol, 74 parts of fumaric acid, 64.5 parts of phosphorus pentachloride and 389 parts of HET acid were charged into a suitable reaction vessel. The reactants were esterified under an inert atmosphere of nitrogen and at an elevated temperature of 160 degrees centigrade until an acid number of 35.5 was obtained. To 100 parts of the polymerizable unsaturated polyester were added 40 parts of styrene containing .014 part of hydroquinone inhibitor. Polymerization was carried out in a manner after Example 3 and a clear, hard, resinous material having the properties set forth in Table III was obtained.

*Table III*

PHOSPHOROUS DERIVED FROM POLYESTER PORTION OF RESIN

| Ex. No. | Phosphorous ctg. cpd. | Chlorine content before and after styrenating | | Phosphorous content before and after styrenating | | Burning rate in in. per min. as per ASTM 757-49 |
|---|---|---|---|---|---|---|
| | | Before | After | Before | After | |
| 12 | | 40.4 | 28.9 | | | 0.19 |
| 17 | Tris-methylol phosphine oxide | 40.0 | 28.0 | 2.1 | 1.5 | |
| 18 | Bis-hydroxymethane phosphinic acid | 39.3 | 28.1 | 1.0 | 0.72 | |
| 19 | Hydroxymethyl phosphonic acid | 45.8 | 32.7 | 0.54 | 0.39 | 0.10 |
| 20 | Phosphorous acid | 40.5 | 28.9 | 0.24 | 0.17 | 0.10 |
| 21 | Phosphorous trichloride | 40.6 | 29.0 | 0.24 | 0.17 | 0.12 |
| 22 | Phosphoric acid | 37.7 | 26.9 | 0.21 | 0.15 | 0.12 |
| 23 | Benzene phosphonic acid | 39.0 | 27.9 | 0.72 | 0.51 | 0.12 |
| 24 | Phosphorous oxychloride | 39.6 | 28.3 | 1.8 | 1.3 | |
| 25 | Phosphorous pentachloride | 41.9 | 29.9 | 1.7 | 1.2 | |

A study of Table III shows that the fire resistance of the resins of this invention may also be greatly improved when the chemically combined phosphorus of the final copolymerized resin is derived from the polyester portion of the resin. For example the burning rate is just about halved (0.19 to 0.10 inch per minute) when hydroxymethyl phosphonic acid or phosphorous acid are used, while slightly less substantial improvements are realized when using other of the phosphorus containing compounds shown.

The following examples set forth in Table IV indicate how various properties change as the proportion of styrene in the final copolymerized resins of this invention is changed. Type A resin is similar to that of Example 12. These resinous compositions were styrenated and polymerized as previously described.

Table IV

| Ex. No. | Type resin | Phosphorus ctg. cpd. added to the esterification reactants | Percent P before and after styrenating | | Styrene in parts per hundred of resin | Acid No. | ASTM D-757-49 | Percent Cl before and after styrenating | | Viscosity in poise at 23 degrees cent. |
|---|---|---|---|---|---|---|---|---|---|---|
| | | | Before | After | | | | Before | After | |
| 26 | A | Phosphorous acid | 0.20 | 0.14 | 40 | 35.5 | 0.10 | 40 | 28.6 | 25.7 |
| 27 | A | do | 0.20 | 0.13 | 50 | 35.5 | 0.11 | 40 | 26.6 | 7.4 |
| 28 | A | do | 0.20 | 0.13 | 55 | 35.5 | 0.10 | 40 | 25.8 | |
| 29 | A | do | 0.20 | 0.12 | 60 | 35.5 | 0.11 | 40 | 25.0 | 1.3 |

The table shows that as styrene is added, prior to polymerization, the viscosity is reduced almost 20 times without incurring a loss in fire resistance. This is important because for many commercial processes, low viscosity resinous compositions are necessary. The table also shows that even though the chlorine content of the final copolymerized resins is lowered by the increasing amounts of styrene added, the flame resistance of the resins is not adversely affected. In contrast to this, the same type resin A, without any phosphorus incorporated therein gives burning rates of 0.19, 0.21, 0.22, and 0.23 in Examples 26, 27, 28, and 29 respectively.

The following polyester resinous compositions set forth in Table V are similar to these previously described and are also capable of having their flame resistant properties improved by the addition of phosphorous by means of any of the phosphorus containing materials previously mentioned:

Table V

| Ex. No. | Ethylene glycol | Diethylene glycol | Maleic anhydride | Adduct of hexahalocyclopentadiene and dienophile other than HET anhydride or HET acid | Parts |
|---|---|---|---|---|---|
| 30 | 6.2 | 10.6 | 9.8 | Adduct of hexahalocyclopentadiene and fumaric acid. | 28.9 |
| 31 | | | | Cast material of Example 4 +diallyl 1,4,5,6,7,7-hexachlorobicyclo (2.2.1)-5-heptene-2,3-dicarboxylate (adduct of hexachlorocyclopentadiene and maleic anhydride diesterified with allyl alcohol). | 24.2 / 9.7 |
| 32 | 16.7 | 28.6 | 26.4 | 1,4,5,6,7,7-hexachloro-2-methyl-bicyclo-(2.2.1)-5-heptene-2,3-dicarboxylic anhydride (adduct of hexahalocyclopentadiene and citraconic anhydride). | 105.5 |
| 33 | 16.6 | 28.4 | 26.4 | Mono-methyl ester of 1,4,5,6,7,7-hexachlorobicyclo-(2.2.1)-5-heptene-2,3-dicarboxylic acid (adduct of hexahalocyclopentadiene and maleic anhydride, half esterified with methanol). | 114.4 |
| 34 | | | 24.5 | 3-(1,4,5,6,7,7-hexachlorobicyclo-(2.2.1)-5-heptene-2-yl)-methoxy-1,2-propanediol (adduct of hexahalocyclopentadiene and alpha allyl glycerol ether). | 101.3 |
| 35 | 5.2 | 8.9 | 8.3 | 1,4,5,6-tetrachloro-7-7-difluorobicyclo-(2.2.1)-5-heptene-2,3-dicarboxylic acid (adduct of 1,2,3,4-tetrachloro-5,5-difluorocyclopentadiene and maleic anhydride). | 30 |
| 36 | 13.2 | 22.4 | 17.4 | 1,4,5,6,7,7-hexachlorobicyclo-(2.2.1)-5-heptene-2-acetic-2-carboxylic anhydride (adduct of hexahalocyclopentadiene and itaconic anhydride). | 108 |
| 37 | | | 24.5 | 2,3-dimethylol-1,4,5,6,7,7-hexachlorobicyclo (2.2.1)-5-heptene (adduct of hexahalocyclopentadienes and 2-butene-1,4-diol). | 90.2 |
| 38 | 13.2 | 22.4 | 17.4 | 1,4,5,6,7,7-hexachloro-2-chloro-bicyclo-(2.2.1)-5-heptene-2,3-dicarboxylic anhydride (adduct of hexahalocyclopentadiene and chloromaleic anhydride). | 110 |

The following Examples 39 through 44 are given in order to establish that when proceeding in accordance with our invention the phosphorus becomes chemically combined in the polymerized resin. Examples 39, 40, 41, and 42 show that when triethyl phosphate, tricresyl phosphate, triphenyl phosphate or tributyl phosphate are incorporated in the polyester resin by the procedures depicted that these are not chemically combined into the final polymerized resin but merely are physically combined in the resinous composition as additives because in each case the heat distortion temperatures of the finally polymerized resins formed are adversely affected. Comparison of the heat distortion temperatures of these examples with the heat distortion temperature of the product of this invention, shown in Example 43, which was conducted so that specific comparisons could be made, and of non-phosphorus containing resins, shown in Example 44, which was conducted for control purposes, show that polymerized resins of this invention have the phosphorus chemically combined in them as evidenced by their high heat distortion temperature.

EXAMPLE 39

A resin was made using the following proportion of materials: HET acid 633.1 parts, fumaric acid 128.1 parts, ethylene glycol 148.3 parts, diethylene glycol 36.2 parts, triethyl phosphate 60.0 parts. This mixture was charged into a 1 liter reaction vessel with nitrogen inlet leading to the bottom of the flask, stirrer, thermometer and means for distillation of water of esterification. The mixture was heated with stirring and passage of nitrogen through the mixture at a temperature of 160 degrees centigrade, until an acid number of 32.5 had been reached. This mixture was poured into trays and 100 parts were then dissolved in 40 parts of styrene. One hundred parts of the styrenated solution of resin was mixed with two parts of Luperco ATC, a mixture of 50 parts of tricresyl phosphate and 50 parts of benzoyl peroxide. This was cast into a tube and heated in a water bath at 50 degrees centigrade for 24 hours, followed by 24 hours' heating at 120 degrees centigrade. A sample of this casting was then cut into samples for heat distortion determination. The heat distortion temperature of this resin was 89 degrees centigrade.

EXAMPLE 40

A resin was made by reacting 633.1 parts of HET acid, 128.1 parts of fumaric acid, 148.3 parts ethylene glycol and 36.2 parts diethylene glycol. These materials were charged into a 1 liter reaction vessel provided with a nitrogen inlet, a stirrer, a thermometer and means for distillation of water of esterification. The reaction was carried out at 160 degrees centigrade with stirring and nitrogen passing through the mix. When an acid number of 34 had been reached the resin was poured out into a tray and allowed to cool. To 100 parts of this resin was added 40 parts of styrene and the mixture was brought to complete solution. To 100 parts of this styrenated resin was then added 10 parts of tricresyl phosphate. This mixture was catalyzed by adding 2 parts of Luperco ATC, a mixture of 50 parts of tricresyl phosphate and 50 parts of benzoyl peroxide. The catalyzed resin was poured into a tube and cured at 50 degrees centigrade in a water bath for 24 hours followed by 24 hours' curing at 120 degrees centigrade. The heat distortion was then determined and it was found to be 83 degrees centigrade.

EXAMPLE 41

The styrenated resin composition of Example 40 was also used in this example, 41. To 100 parts of this styrenated resinous composition was added 10 parts of triphenyl phosphate. The catalyzation and curing of this resin were carried out in the same manner as Example 40. In this case the heat distortion temperature was found to be 83 degrees centigrade. Triphenyl phosphate, and tricresyl phosphate are well known in the art as being flame proofing additives for resins and plastics. It also is well known that they exhibit a plasticizing action and that they lower the heat distortion temperature of the rigid thermoset products to which they are added.

EXAMPLE 42

Eight hundred three and four-tenths grams of HET acid, 162.6 grams of fumaric acid, 169.6 grams of ethylene glycol, 46.0 grams of diethylene glycol and 39.9 grams of tributyl phosphate were charged into a 1 liter reaction vessel provided with means for introduction of nitrogen to the bottom of the reaction mix, a stirrer, thermometer and an outlet for distillation of water of esterification. The reaction vessel was heated with stirring and passage of nitrogen at a temperature of 160 degrees centigrade until an acid number of 43 had been reached. The contents were then cast out into trays. One hundred parts of this base resin were dissolved in 40 parts of styrene. The water of esterification of this reaction was analyzed for butyl alcohol. It was found that 0.5 gram of butyl alcohol had been distilled out of the reaction mix. Had complete esterification taken place with the tributyl phosphate a total of 66.7 grams of butyl alcohol would have been present in the distillate. The fact that the alcohol did not distill out indicates that very little or no reaction of the tributyl phosphate had taken place. One hundred grams of the styrenated resinous composition of this example was catalyzed with 2 parts of Luperco ATC, a mixture of 50 parts tricresyl phosphate and 50 parts of benzoyl peroxide. This catalyzed resin was cast into tubes and cured at 50 degrees centigrade in a water bath for 24 hours followed by 24 hours' curing at 120 degrees C. in an oven. A sample of this casting was tested for heat distortion temperature which was found to be 89 degrees centigrade.

EXAMPLE 43

A resin was made using the following proportion of materials: HET acid 633.1 parts, fumaric acid 128.1 parts, ethylene glycol 162.6 parts, diethylene glycol 36.2 parts, phosphorous acid 18.9 parts. This mixture was charged into a 1 liter reaction vessel with nitrogen inlet leading to the bottom of the flask, stirrer, thermometer and means for distillation of water of esterification. The mixture was heated with stirring and passage of nitrogen through the mixture at a temperature of 160 degrees centigrade, until an acid number of 32.5 had been reached. This mixture was poured into trays and 100 parts were then dissolved in 40 parts of styrene. One hundred parts of the styrenated solution of resin was mixed with 2 parts of Luperco ATC, a mixture of 50 parts of tricresyl phosphate and 50 parts benzoyl peroxide. This was cast into a tube and heated in a water bath at 50 degrees centigrade for 24 hours, followed by 24 hours' heating at 120 degrees centigrade. A sample of this casting was then cut into samples for heat distortion determination. The heat distortion temperature of this resin was 105 degrees C.

EXAMPLE 44

A resin was made using the following properties of materials: HET acid 633.1 parts, fumaric acid 128.1 parts, ethylene glycol 148.3 parts, and diethylene glycol 36.2 parts. The mixture was charged into a 1 liter reaction vessel provided with nitrogen inlet leading to the bottom of the flask, stirrer, thermometer and means for water of esterification distillation. The flask was heated at a temperature of 160 degrees centigrade until an acid number of 34 had been reached. The mixture was then poured out into trays and allowed to cool. One hundred parts of this base resin was dissolved in 40 parts of styrene. One hundred parts of the styrenated solution was mixed with 2 parts of Luperco ATC, a mixture of 50 parts tricresyl phosphate and 50 parts benzoyl peroxide. This catalyzed resin was cast into tubes and cured at 50 degrees centigrade in a water bath for 24 hours, followed by curing at 120 degrees centigrade for 24 hours. Heat distortion samples were cut from this casting. The heat distortion temperature of this resin was 105 degrees C.

Not only are heat distortion temperature results impaired when non-reactive phosphorus containing materials are added, even in small amounts, but they are also impaired when phosphorus containing materials having limited ability to combine chemically into the resin are used in excess of the amount that can be combined. Evidence of this is derived from Table I pertaining to the results obtained in heat distortion temperatures as the quantity of phosphorus added (derived from di (chloropropyl propanylphosphonate)) is changed. In those examples where the maximum limit of phosphorus in chemical combination has been approached, the heat distortion temperature results show an improvement over resins without any phosphorus incorporated therein or at least are approximately as good as resins without any phosphorus incorporated therein, while in that example where the limit of phosphorus in chemical combination has been exceeded, the di (chloropropyl propenylphosphonate) then functions as a plasticizer and the heat distortion temperature result falls off badly.

The processing techniques and the chemical reactions depicted herein for producing the necessary ingredients to be used in making the compositions of this invention are subject to various modifications and the proportions of ingredients may also be varied without departing from our invention.

The temperature for carrying out the reaction between the polyhydric alcohols and polybasic acids ranges from 100 degrees centigrade and to 200 degrees centigrade, although higher or lower temperatures can be used; preferably around 150 degrees centigrade to 180 degrees centigrade is advantageously employed.

An inert gas such as nitrogen is passed through the mixture in a preferred procedure to accelerate the progress of the reaction and allow for good color of the product. The progress of the reaction is followed by measuring the rate of water liberated, by the viscosity of the resin, by its acid number, or by other methods commonly known in the art. The extent to which the reaction is carried out will depend on a number of factors, such as the desired viscosity, melting point, duration of reaction, etc.

Esterification catalysts such as para-toluene sulfonic acid, benzene sulfonic acid, beta naphthalene sulfonic acid, etc, or amines such as, pyridine, triethyl amine, quinoline, etc., may be added to the reaction mixture.

The proportion of polyhydric alcohol is approximately controlled by the total mol proportion of acids in the esterification reaction mixture. In making certain compositions of our invention we prefer to react the polyhydric alcohols and polybasic acids in a roughly equimolar proportion, however, either the acids or alcohols may be in substantial excess, if it is desired to form a low molecular weight polyester resin.

A chain stopper may be added in a minor proportion depending on the molecular weight of the linear unsaturated polyester chain desired, in order to rapidly terminate the growth of the unsaturated polyester chain during the esterification reaction and when the desired acid number is being approached, or, to reduce the number of free carboxyl or hydroxyl groups, or, to introduce a hydrocarbon terminal residue. Among the compounds which may be used as chain stoppers during the esterification reaction whereby the unsaturated polyester chain is produced are a wide variety of monohydric alcohols, such as, butyl, hexyl, octyl, dodecyl, benzyl, tetrahydrofurfuryl, etc. or, monobasic acids, such as, acetic, propionic, butyric, ethyl hexoic, benzoic, etc.

The solution or mixture of unsaturated polyester and olefinic cross-linking agent is preferably made while the unsaturated polyester is still hot, thereby facilitating rapid solution. Alternatively, the unsaturated polyester may be cooled and stored and when ready for mixing may be heated in order to facilitate solution in the olefin, which may also be heated. The solution may, of course, be made in the cold, especially if there is any possibility of explosion in handling the hot olefinic cross-linking agent or if polymerization of the olefinic cross-linking agent cannot be prevented when at elevated temperatures even by the presence of inhibitors therefor.

The proportion of olefinic cross-linking agent to unsaturated polyester may be varied within the ultimate limits of each without departing from the scope of this invention, in order to make the solution or mixture of this invention which may be set to the infusible, insoluble, polyester resin. For example, only a small proportion of olefinic cross-linking agent is needed when the proportion of reactive cross-linkable olefinic bonds in the unsaturated polyester is very small; and a still smaller proportion of olefinic cross-linking agent may be employed if it is desired to react only a part of the total of said unsaturated bonds in such polyester in the cross-linking reaction. On the other hand, a major proportion of olefinic cross-linking agent to unsaturated polyester may be employed when the proportion of reactive cross-linkable olefinic bonds in the unsaturated polyester is high; and a still higher proportion of olefinic cross-linking agent will be required if it is desired to react a major part of the total of said unsaturated bonds in such polyester in the cross-linking reaction. In general, the concentration of the unsaturated polyester in the olefinic cross-linking agent may vary between about 10 and 90 percent. In certain formulations and in order to accentuate a large number of desirable properties in the polyester resin produced, we find it preferable to employ between about 15 and 45 percent of the olefinic cross-linking agent, e.g., styrene, when the unsaturated polyester is similar to that produced in Example 1; however, it is to be understood that this preferred concentration is a variable which is dictated by the particular properties of the materials employed and the particular properties desired in the polyester resin produced.

Polymerization inhibitors, usually of the order of 0.001 to 1 percent of the composition may be added to prevent premature polymerization. Among the inhibitors which may advantageously be employed to prevent the premature polymerization of the mixture of unsaturated polyester and olefinic cross-linking agents, particularly if the mixture is to be stored or shipped in commerce prior to curing, are substances such as hydroquinone, benzoquinone, para-tertiary-butyl catechol, paraphenylene diamine, trinitrobenzene, picric acid, etc.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, cumene hydroperoxide, etc., have been found satisfactory. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, cobalt maleate, cobalt naphthenate, etc., or, by amines such as dibutyl amines, or mercaptans such as dodecyl mercaptan, etc. These are used in proportions similar or smaller to that stated for catalysts.

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, thereby providing a decided advantage over other insoluble, infusible resins known heretofore, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc.

Various hexahalocyclopentadienes may be employed in making compositions embraced within the scope of this invention such as the chloro, bromo and fluoro substituted cyclopentadienes wherein all of the hydrogens are replaced by one or more of the foregoing halogens. While hexachlorocyclopentadiene is today the most readily available hexahalocyclopentadiene, we have found that the mixed perhalo compounds are useful in making Diels-Alder adducts which can be chemically combined into the saturated polyester compositions of this invention.

In fact, hexachlorocyclopentadiene in which one or two of the chlorine atoms has been replaced with bromine, appears to afford an even higher degree of flame retardance in the polyester resins. The polyester resins made from a hexahalocyclopentadiene in which some of the chlorine of hexachlorocyclopentadiene has been replaced with fluorine atoms, are exceedingly interesting materials possessing enhanced heat resistance and aging properties. The foregoing applies whether the hexahalocyclopentadiene is utilized as a raw material in the making of the copolymerizable linear polyester or the unsaturated cross-linking agent.

The compounds useful in making adducts of hexahalocyclopentadienes are dienophiles having a plurality of esterifiable groups. These functional groups capable of esterification and having utility herein are found in compounds such as substituted or unsubstituted acids, anhydrides, acid halides, alcohols and esters, as hereinbefore illustrated.

The hexahalocyclopentadiene radical may be combined into the polycarboxylic acid unit of the unsaturated polyester chain in a variety of ways such as by effecting the Diels-Alder reaction of the hexahalocyclopentadiene with unsaturated polycarboxylic acids such as maleic or fumaric; substituted maleics or fumarics such as, citraconic, chloromaleic, mesaconic, and pyrocinchonic; acetylene dicarboxylic acids; and also ethylenic substituted succinic anhydrides or acids, such as, aconitic and itaconic, etc. Instead of employing the polycarboxylic acids or anhydrides in the Diels-Alder reaction, adducts of hexahalocyclopentadiene with substances which produce an equivalent polyester chain upon reaction with a polyhydric alcohol can be used; for instance, acid chlorides, or, esters of the acids or anhydrides may also be used. A typical illustration is had in the Diels-Alder reaction of hexachlorocyclopentadiene with fumaryl chloride to produce 1,4,5,6,7,7 - hexachlorobicyclo - (2.2.1)-5-heptene-2,3-dicarbonyl chloride followed by the esterification of this with ethylene glycol and maleic anhydride to produce the unsaturated polyester. In place of the acid chloride, diesters such as, dimethyl maleate may be employed.

The hexahalocyclopentadiene radical may be combined into the polyhydric alcohol unit of the unsaturated polyester chain in a variety of ways such as, by effecting the Diels-Alder reaction of the hexahalocyclopentadiene with unsaturated polyhydric alcohols such as, butene-diol or pentene-diol, etc. Other suitable compounds are ethers or esters derived from polyhydric alcohols having at least three hydroxyl groups, one of which is esterified or etherified with an unsaturated alcohol or acid reactive with hexahalocyclopentadiene in the diene synthesis. For instance, allyl or vinyl glycerol ethers, allyl or vinyl pentaerythritol ethers; and unsaturated acid esters of glycerol or pentaerythritol, etc., such as, acrylic or methacrylic esters thereof may be used. Instead of employing a polyhydric alcohol in the Diels-Alder reaction, adducts of hexahalocyclopentadienes with substances which produce an equivalent unsaturated polyester chain, upon reaction with a polycarboxylic acid can be used; for instance, esters of the alcohols may also be used.

The unsaturated polyester chains produced by effecting the Diels-Alder reaction of hexahalocyclopentadiene with an unsaturated polycarboxylic acid or polyhydric alcohol, followed by the esterification of the product so produced with a polyfunctional alcohol or acid, can be rendered copolymerizable by chemically combining in such polyester chains, a reactive and unsaturated chemical ingredient which retains its active unsaturation after its chemical combination into the polyester chain. Among the materials which may be gainfully employed for this purpose are the unsaturated polycarboxylic acids such as, maleic, fumaric, citraconic, itaconic, acetylene dicarboxylic and esters and halogen substituted derivatives thereof, etc.; the unsaturated polyhydric alcohols such as, butene-diol, pentene-diol, etc., also unsaturated hydroxy ethers such as allyl or vinyl glycerol ethers, allyl or vinyl pentaerythritol ethers, etc.; and, still other chemical compounds comprising an ethylenic or an acetylenic linkage which are not rendered unreactive in the polyester chain by their chemical combination into the polyester chain by way of other functional groups, whereby the mixed esters are produced.

Another method of providing for copolymerizable unsaturation in the polyester chain which may be employed involves: effecting the diene synthesis of hexachlorocyclopentadiene with a polybasic alcohol or acid or ester, or equivalents thereof, which contains at least two olefinic linkages, one of which is reactive in the diene synthesis, while the others which are unreacted, are capable of being copolymerizable in the cross-linking reaction. Among the materials which are useful for this purpose are acetylenic compounds and di-olefinic and poly-olefinic compounds.

Alternatively, or in addition to including the flame retardant component in the unsaturated polyester, we have found that the chlorine content of the final polyester formulations may be obtained, or substantially increased, by employing a cross-linking agent which also contains the component which imparts flame retardance to the final compositions of this invention. Among such cross-linking agents which may be useful for this purpose are the following: Diallyl - 1,4,5,6,7,7-hexachlorobicyclo-(2.2.1)-5-heptene-2,3-dicarboxylate; diallyl-1,4,5,6,7,7-hexachloro-2-methylbicyclo - (2.2.1) - 5-heptene-2,3-dicarboxylate; diallyl - 1,2,4,5,6,7,7 - heptachlorobicyclo-(2.2.1)-5-heptene-2,3-dicarboxylate; and triallyl-1,4,5,6,7,7-hexachlorobicyclo - (2.2.1)-5 - heptene-2-acetate-2,3-dicarboxylate. These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example, reaction products of hexachlorocyclopentadiene with isoprene or butadiene retaining a reactive unsaturated linkage can be used as cross-linking agents directly without further reaction. Still other methods for the preparation of the unsaturated cross-linking agents, employing type reactions known to the art, will be apparent from the foregoing. In addition materials such as triallyl cyanurate may be employed for improving heat resistance; divinyl benezne, monochlorostyrene, dichlorostyrene, diallyl phthalate, diallyl maleate and similar mono- or poly-vinyl or mono- or poly-allyl derivatives are also useful.

It is apparent from a consideration of the foregoing examples and the foregoing discussion that the particular chemical ingredients selected and their relative proportions may be varied over a wide range to produce a wide variety of compositions embraced within this invention. It should be emphasized that modifications can be made to accentuate any given property or combination of properties desired. For example, hardness in the final polyester resin can be varied by using a short chain polyhydric alcohol and acids or long chain polyhydric alcohols and acids; the viscosity of the mixture comprising the unsaturated polyester and olefinic cross-linking agent may be varied by changing the ratio of unsaturated polyester to olefinic cross-linking agent; and the curing characteristics of such mixtures can be varied by changing the kind and proportion of polymerization catalyst employed. In order to accentuate both flame retardance and heat resistance, we prefer that the hexachlorocyclopentadiene content should not comprise less than seven percent by weight of the polyester resin compositions; the upper limit for the hexachlorocyclopentadiene content is generally dictated by practical limits determined by the minimum necessary concentration of glycols and unsaturated dibasic acids not being adducts of hexachlorocyclopentadiene and olefins to give resinous compounds capable of being hardened and this upper limit is about 60 percent. Flame retardance may be accentuated by adding to the unsaturated polyester containing the hexachlorocyclopentadiene component, a cross-linking agent which also contains the flame retardant component made from hexachlorocyclopentadiene in chemical combination therewith. It may be further accentuated by esterifying a polycarboxylic acid and polyhydric alcohol which each contain the hexahalocyclopentadiene flame retardant component of this invention and cross-linking this with a fire resistant cross-linking agent. It may be even further accentuated by chemically incorporating phosphorus in the ways previously described in this application.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as chopped fiber glass rivings, macerated fabric, asbestos fibers, mica, etc., which serve as fibrous reinforcing media and incorporating a small percentage of a mold lubricant, catalyst and/or promoter.

An infinite variety of products may also be prepared, which embody the compositions of this invention, by copolymerizing the linear unsaturated polyester materials produced in accordance with this invention, as in Example 1, with a mono-olefinic cross-linking agent in the presence of another copolymerizable linear polyester material having different structure than that produced by this invention. For example, by dissolving 23.1 parts of the product of Example 1 and 4.3 parts of an unchlorinated commercial polyester resin dissolved in styrene especially designed for imparting flexibility and designated as Paraflex P-13 (made by Rohm & Haas Company, Philadelphia, Pennsylvania) and 2.3 parts by weight of styrene and effecting the copolymerization of the mixture by a catalyst a material is produced which has better flexibility and different properties than any materials produced heretofore. It is to be understood that dyes, pigments, plasticizers, lubricants and various other modifying agents are contemplated as being incorporated in certain formulations to produce compositions embraced in this invention in order to obtain or accentuate any given property.

This application is a continuation-in-part of our copending application, Serial No. 308,921, filed Sept. 10, 1952, now United States Patent 2,779,701.

Having thus described our invention what we claim and desire to secure by Letters Patent is:

1. A polymerizable mixture comprising (A) a polymerizable linear polyester resin, comprised of the reaction product of a polycarboxylic acid and a polyhydric alcohol, said resin having olefinic polymerizable unsaturation and (B) a vinylidene monomer; an ingredient (I) of said mixture containing a chemically combined component which is a chemical reaction adduct of hexahalocyclopentadiene wherein the halogen is selected from the group consisting of chlorine, bromine, fluorine, and mixtures thereof, with a material selected from the group consisting of a polycarboxylic compound containing aliphatic carbon to carbon unsaturation and a polyhydric alcohol containing aliphatic carbon to carbon unsaturation, wherein said polycarboxylic compound is selected from the group consisting of polycarboxylic acids, polycarboxylic anhydrides and polycarboxylic acid halides, and an ingredient (II) of said mixture containing a compound of phosphorus, both the adduct of I and the phosphorus of II being chemically combined in the polymerized resin when said polymerizable mixture is copolymerized, and wherein said compound of phosphorus is combined in said vinylidene monomer, and is selected from the group consisting of bis (betachloroethyl) vinyl phosphonate and di (chloropropyl) propenyl phosphonate bis (betachloroethyl) vinyl phosphonate.

2. A polymerizable mixture according to claim 1 wherein the compound of phosphorus is bis(betachloroethyl) vinyl phosphonate.

3. A polymerizable mixture according to claim 1 wherein the compound of phosphorus is di(chloropropyl) propenyl phosphonate.

4. A composition of claim 1 wherein the ingredient (I) is contained in the (A) portion of the polymerizable mixture.

5. A composition of claim 1 wherein the hexahalocyclopentadiene is hexachlorocyclopentadiene.

6. A composition of claim 1 when polymerized to an infusible, insoluble, resinous composition.

7. A composition of claim 1 when mixed with an inert filler and polymerized to an infusible, insoluble, resinous composition.

8. A reinforced plastic article comprising a composition of claim 1 when polymerized to an infusible, insoluble, resinous composition, and a fibrous reinforcing medium.

9. A laminated article comprising a plurality of sheets of glass fibrous material and as a binder therefor, an infusible, insoluble, resinous composition resulting from the polymerization of a composition defined in claim 1.

10. A composition of claim 1 when having at least 7 percent by weight of halogen content of the total mixture and wherein the chemically combined phosphorus is present in an amount between 0.05 percent and 10 percent by weight of the total mixture.

11. A composition of claim 4 wherein the ingredient (I) is contained in the acid portion of (A).

12. A composition of claim 4 wherein the ingredient (I) is contained in the alcohol portion of (A).

13. A composition of claim 11 wherein said adduct is the chemical reaction adduct of hexahalocyclopentadiene and a polycarboxylic compound containing aliphatic carbon to carbon unsaturation selected from the group consisting of polycarboxylic acids, polycarboxylic anhydrides, and polycarboxylic acid halides, wherein the halogen is selected from the group consisting of chlorine, bromine, fluorine, and mixtures thereof.

14. A composition of claim 12 wherein said adduct is the chemical reaction adduct of hexahalocyclopentadiene and a polyhydric alcohol containing aliphatic carbon to carbon unsaturation wherein the halogen is selected from the group consisting of chlorine, bromine, fluorine, and mixtures thereof.

References Cited in the file of this patent
UNITED STATES PATENTS

| | | |
|---|---|---|
| 2,586,885 | Toy et al. | Feb. 26, 1952 |
| 2,639,252 | Simon et al. | May 19, 1953 |
| 2,779,700 | Robitschek et al. | Jan. 29, 1957 |
| 2,779,701 | Robitschek et al. | Jan. 29, 1957 |
| 2,863,794 | Robitschek et al. | Dec. 9, 1958 |
| 2,863,795 | Robitschek et al. | Dec. 9, 1958 |